(12) United States Patent
Clemen

(10) Patent No.: US 8,678,760 B2
(45) Date of Patent: Mar. 25, 2014

(54) BYPASS DUCT OF A TURBOFAN ENGINE

(75) Inventor: Carsten Clemen, Mittenwalde (DE)

(73) Assignee: Rolls-Royce Deutschland Ltd & Co KG (DE)

(*) Notice: Subject to any disclaimer, the term of this patent is extended or adjusted under 35 U.S.C. 154(b) by 472 days.

(21) Appl. No.: 13/082,677

(22) Filed: Apr. 8, 2011

(65) Prior Publication Data

US 2011/0255964 A1   Oct. 20, 2011

(30) Foreign Application Priority Data

Apr. 14, 2010   (DE) .................... 10 2010 014 900

(51) Int. Cl.
*F01D 9/00*   (2006.01)

(52) U.S. Cl.
USPC .................... 415/211.2; 415/209.1

(58) Field of Classification Search
USPC .............. 415/144, 208.1, 211.1, 209.1, 211.2
See application file for complete search history.

(56) References Cited

U.S. PATENT DOCUMENTS

| | | | |
|---|---|---|---|
| 3,494,129 A | | 2/1970 | Krebs et al. |
| 3,701,255 A | | 10/1972 | Markowski |
| 3,769,797 A | | 11/1973 | Stevens |
| 3,797,239 A | | 3/1974 | Hausmann et al. |
| 3,990,810 A | * | 11/1976 | Amos et al. .................... 415/161 |
| 4,005,574 A | | 2/1977 | Smith, Jr. |
| 4,793,770 A | * | 12/1988 | Schonewald et al. ......... 415/190 |
| 4,989,406 A | | 2/1991 | Vdoviak et al. |
| 5,848,526 A | * | 12/1998 | Hanson ........................ 60/226.1 |
| 6,082,966 A | * | 7/2000 | Hall et al. .................. 415/209.1 |
| 6,209,311 B1 | | 4/2001 | Itoh et al. |

| | | |
|---|---|---|
| 2006/0101804 A1 | 5/2006 | Stretton |
| 2008/0236137 A1 | 10/2008 | Julliard et al. |
| 2010/0158684 A1* | 6/2010 | Baralon ..................... 415/208.1 |

FOREIGN PATENT DOCUMENTS

| | | |
|---|---|---|
| CA | 2683382 | 5/2010 |
| DE | 1911076 | 9/1969 |
| DE | 3814971 | 5/1976 |
| DE | 2617039 | 11/1976 |
| DE | 3942203 | 7/1990 |
| DE | 2718663 | 6/2003 |
| JP | 2004137950 | * 5/2004 |

OTHER PUBLICATIONS

Nohara et al., Microwave Reflection Controlling Device, May 13, 2004, Abstract of JP 2004-137950.*
German Search Report dated Mar. 4, 2011 from corresponding patent application.

* cited by examiner

*Primary Examiner* — Edward Look
*Assistant Examiner* — Liam McDowell
(74) *Attorney, Agent, or Firm* — Timothy J. Klima; Shuttleworth & Ingersoll, PLC

(57) ABSTRACT

On a turbofan engine, at least one of the downstream guide vanes (1) of the downstream guide vane assembly (2) arranged behind the fan in the bypass duct, and a fairing element (3) arranged behind a downstream guide vane, are provided as a combined—one-piece and aerodynamically shaped—vane and fairing element (4) functioning as both a downstream guide vane and a fairing element for installations arranged in the bypass duct or an aerodynamically shaped supporting strut. The one-piece configuration of a fairing element with upstream vane, i.e. the integration of fairing elements provided with a specific outer contour into the downstream guide vane assembly, results in lower pressure losses and reduced fuel consumption as well as reduced pressure effect on the fan and, consequently, increased operating stability of the fan, higher fan efficiency and reduced sound emission.

4 Claims, 2 Drawing Sheets

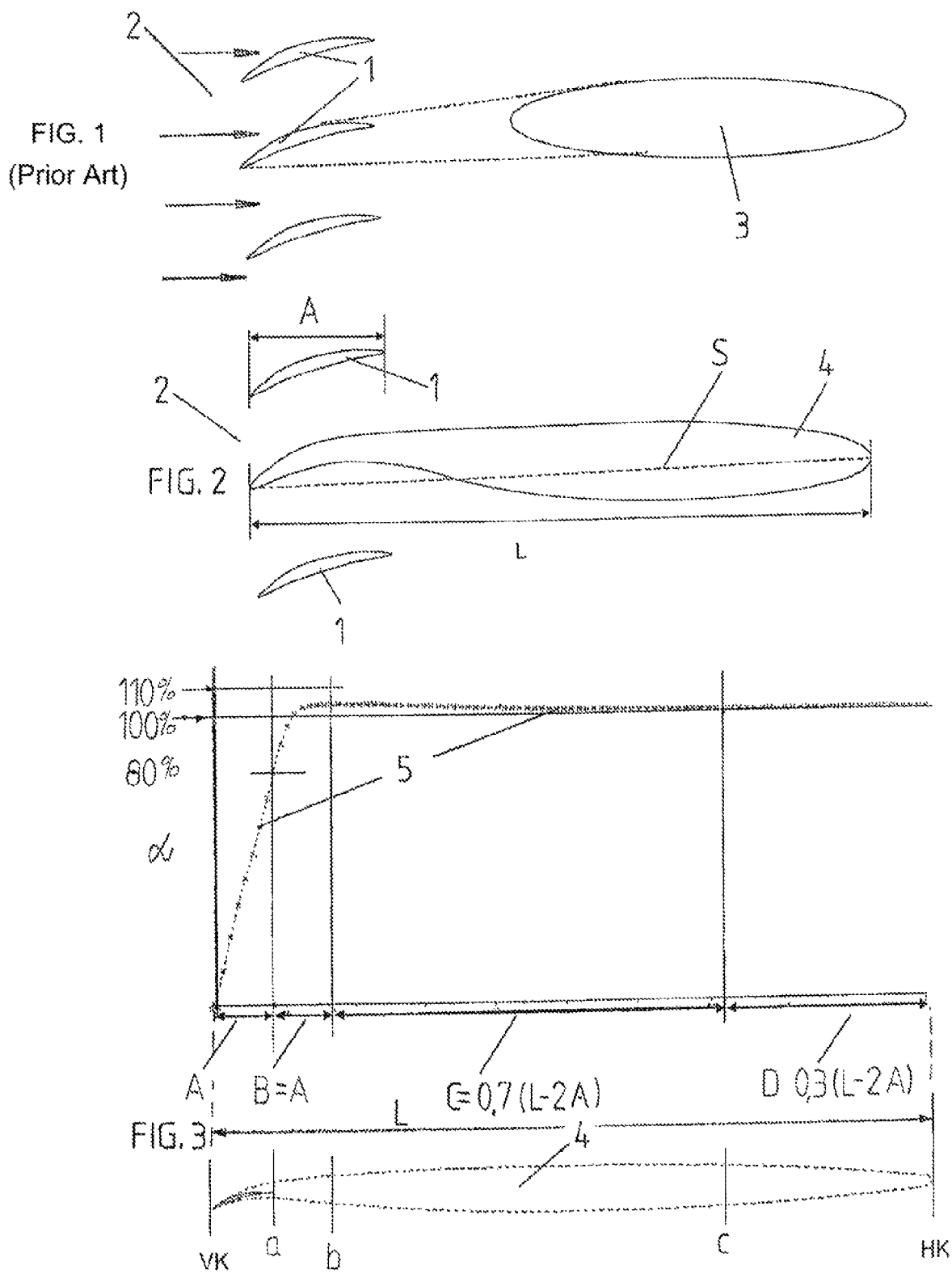

BYPASS DUCT OF A TURBOFAN ENGINE

Figures 4A, 4B:
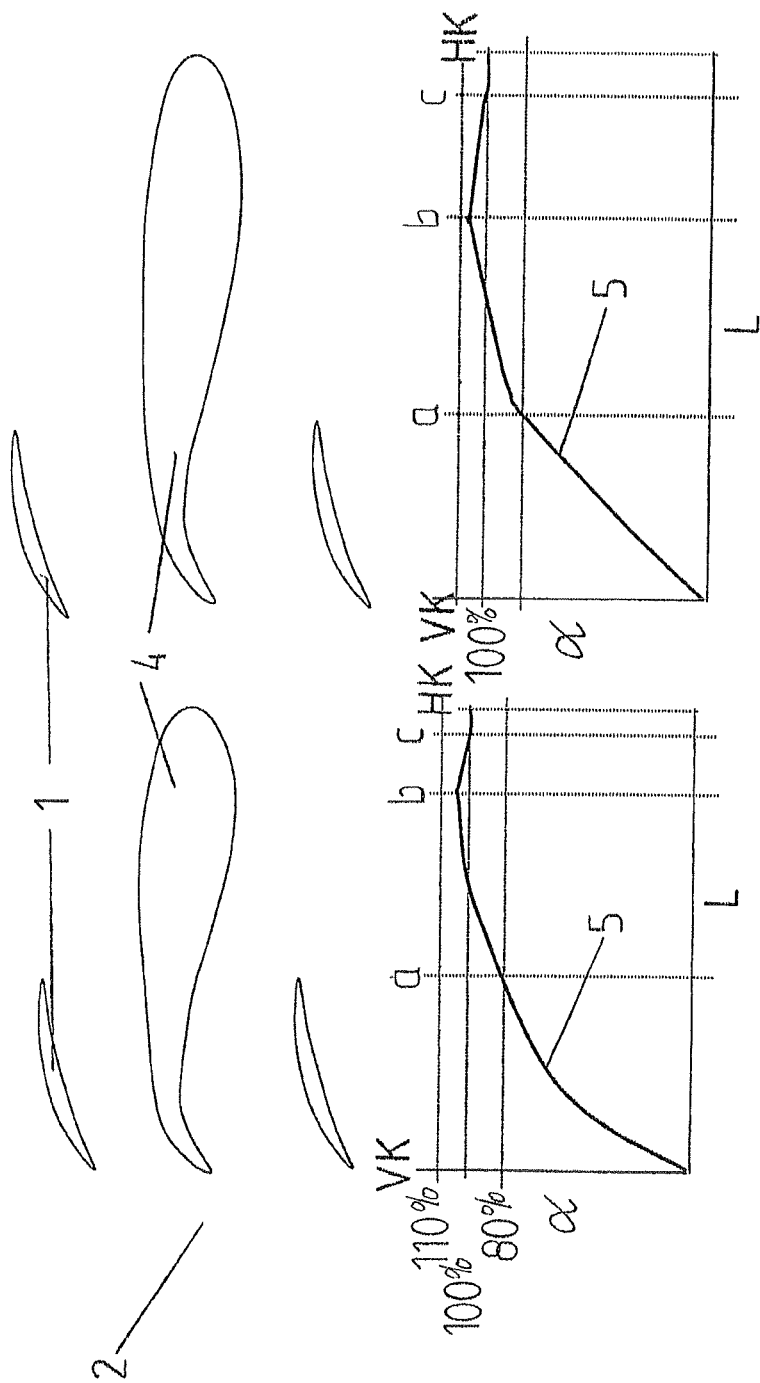

This application claims priority to German Patent Application DE102010014900.4 filed Apr. 14, 2010, the entirety of which is incorporated by reference herein.

This invention relates to a bypass duct of a turbofan engine with downstream guide vanes of a downstream guide vane assembly arranged therein for de-swirling the airflow produced by the fan and fairing elements arranged downstream thereof for installations provided in the bypass duct, such as lines, brackets, supports or drive transmission mechanisms.

Downstream of the fan of turbofan engines, which is arranged on the air intake side, the airflow produced by the fan is divided into a core airflow and a bypass airflow. The core air flows into a core-flow duct, which is surrounded by a bypass duct carrying the bypass airflow. Downstream of the fan, a downstream guide vane assembly is arranged in the bypass duct for de-swirling the airflow produced by the fan. Furthermore, the outer wall of the bypass duct formed by the engine fairing is supported at the side wall of the core-flow duct by radially extending supporting elements, with the side wall simultaneously forming the inner wall of the bypass duct. Moreover, different radially extending installations are arranged in the bypass duct, such as service lines for the aircraft frame and the engine, a radial shaft, supports for the attachment of the engine to the aircraft fuselage or the wings etc. Such installations are, individually or group-wise, shrouded by aerodynamically shaped fairing elements. Likewise, the supporting elements are enclosed by an aerodynamically shaped fairing element or have an aerodynamically shaped cross-sectional profile. The aerodynamic shape of the fairing is intended to reduce pressure losses and vibrations in the by-pass duct as well as adverse effects on engine performance or, respectively, mechanical and acoustical disadvantages associated therewith. While being lower with an aerodynamic fairing than without, the pressure losses produced by the fairing elements on account of their relatively large volume are still high. Moreover, the large-volume fairing elements aerodynamically interact with the upstreamly arranged guide vanes which, in consequence thereof, generate a non-uniform circumferential pressure field reacting on the fan. Associated therewith are negative impacts on fan stability and fan efficiency and, consequently, on engine performance, fuel consumption and the noise level produced by the engine.

A broad aspect of the present invention is to design the bypass duct of a turbofan engine such that the repercussions of the fairing elements on the downstream guide vanes and the fan are minimized and that engine performance is increased at reduced fuel consumption.

The present invention, in its essence, provides that at least one of the downstream guide vanes of the downstream guide vane assembly arranged behind the fan in the bypass duct and a fairing element arranged behind a downstream guide vane are provided as a combined—one-piece and aerodynamically shaped—vane and fairing element having the function of both a downstream guide vane and a fairing element for installations provided in the bypass duct or an aerodynamically shaped supporting strut. The one-piece configuration of a fairing element with an upstream vane, i.e. the integration of fairing elements provided with a specific outer contour into the downstream guide vane assembly, results in lower pressure losses and reduced fuel consumption as well as reduced pressure effect on the fan and, consequently, increased operating stability of the fan, higher fan efficiency and reduced sound emission.

According to a further feature of the present invention, the combined vane and fairing element is designed to provide for de-swirling and low-loss outflow of the airflow in a given, aerodynamically favorable pressure and suction-side outer contour according to a course of the skeleton line angle α of the profile determined by the respective chord length A of the respective downstream guide vane and the total length L of the combined vane and fairing element.

The total length of the combined vane and fairing element between the leading edge and the trailing edge thereof is divided into a first section corresponding to the chord length A of the respective downstream guide vane, a second section whose length essentially conforms to the length of the first section, a third section whose length is approx. 0.7(L−2A), and a fourth section whose length is approx 0.3(L−2A), with the dimensionless skeleton line angle α increasing to a value of 80%±10% by the end of the first section, initially further increasing and finally having a maximum of 105%±5% in the second section, gradually decreasing to 100% in the third section, and remaining constant at 100% in the fourth section.

In development of the present invention, the length of the second section has a variation width of ±5% and the length of the third and fourth sections a variation width of ±10%.

The present invention is more fully described in light of the accompanying drawings showing a preferred embodiment. In the drawings, FIG. 1 is a schematic sectional view of a portion of the downstream guide vane assembly arranged in the bypass duct and of a fairing or supporting element arranged behind a downstream guide vane, FIG. 2 is a representation in accordance with FIG. 1 with a fairing element provided in one-piece configuration with a downstream guide vane, FIG. 3 shows the course of the skeleton line angle along chord S of a downstream guide vane with integrated fairing element, and FIGS. 4a/b are two sectional views of a portion of the downstream guide vane assembly, with the downstream guide vanes having an integrated fairing element. They also show the respective graphical representation of the different course of the skeleton line.

According to FIG. 1, a fairing element 3 is arranged in the bypass duct downstream of one of the downstream guide vanes 1 of a downstream guide vane assembly 2 whose intended connection with the downstream guide vane 1 is indicated by a dotted line. According to FIG. 2, the downstream guide vane 1 and the fairing element 3 are provided as an integral, one-piece, combined vane and fairing element 4. This means that a downstream guide vane 1 and a further downstream fairing element 3 are formed as a one-piece component 4, with the combined vane and fairing element 4 having the function of both an aerodynamically favorable fairing of installations disposed in the bypass duct and a downstream guide vane of the downstream guide vane assembly 2. The cross-sectional profile of the combined vane and fairing element 4 is designed such that the swirl is removed from the fan outflow and the air flows off via the combined vane and fairing element 4 parallel to the engine axis in an aerodynamically favorable manner and with low loss. To fulfill this function, it is a prerequisite that the profile geometry of the combined vane and fairing element 4, which can be described as a superimposition of a thickness distribution and a skeleton line distribution, be optimally designed. The thickness distribution is generally defined as a course of the thickness over the chord length L of the respective profile, while the skeleton line distribution is described as a course of the skeleton line angle distribution along the respective profile chord S. The skeleton line, which is characterized by equal distance (half profile thickness) to both outer contours (pressure side and suction side) of the profile at any point, i.e. which extends centrally through the profile cross-section, is defined by way of the dimensionless skeleton line angle α along the dimensionless length L of the profile chord S. The skeleton line angle α (1) is determined as follows:

$$\alpha(1)=(\alpha_i(1)-BIA)/(BIA-BOA)[\%]$$

where $\alpha_i$ is the local angle of the skeleton line and BIA and BOA are the inlet angle and outlet angle, respectively, measured relative to the engine axis.

FIG. 3 shows the course 5 of the skeleton line angle over the total length L, measured parallel to the engine axis, of the combined vane and fairing element 4 according to the present invention. The axial length L of the combined vane and fairing element 4 between the leading edge VK and the trailing edge HK thereof is subdivided into four sections A, B, C and D. The length of the first section A between the points VK and "a" corresponds to the chord length A of a suction-side adjacent downstream guide vane 1 (see FIG. 1). In this first section A, the dimensionless skeleton line angle α increases and reaches a value of 80% at point "a" at the end of section A. In the subsequent second section B, whose length corresponds to the length of the first section A, the skeleton line angle increases only initially and reaches its maximum value of 105% at point "b" at the end of the second section B. In the following third section C, which has a length of C=0.7(L−2A), the skeleton line angle decreases gradually and reaches a value of 100% at point "c" at the end of the third section C. In the fourth section D, which has a length of D=0.3(L−2A), the skeleton line angle remains constant at 100% up to the trailing edge HK. The lengths of sections B, C and D can vary as follows; the length of the second section B is A±5%, the length of the third section C is 0.7(L−2A)±10% and the length of the fourth section D is 0.3(L−2A)±10%.

FIGS. 4a and 4b show two more variants of a combined vane and fairing element 4 with a length ratio of the sections A, B, C and D dependent on the respective chord length A of the respective downstream guide vane 1 and the total length L of the combined vane and fairing element 4 and an accordingly different course of the skeleton line angle. The thickness distribution over the total length L along the skeleton line described in the above is optional.

The combined—one-piece—design of a downstream guide vane 1 and the fairing element 3 disposed downstream thereof as well as the specific outer contour of the combined vane and fairing element 4 integrated into the downstream guide vane assembly 2, which is based on the given course 5 of the skeleton line angle, enable the pressure losses caused by the conventional fairing elements 3 and the pressure effect acting on the fan in an upstream direction to be significantly decreased, as can also the fuel consumption and noise emission of the engine.

LIST OF REFERENCE NUMERALS

1 Downstream guide vane
2 Downstream guide vane assembly
3 Fairing element, supporting element
4 Combined vane and fairing element
5 Course of dimensionless skeleton line angle
S Profile chord
L Axial length, total length, chord length of 4
α Skeleton line angle
VK Leading edge of 4
HK Trailing edge of 4, end point of section D
A Chord length of a downstream guide vane; First section of total length L
B Second section of L
C Third section of L
D Fourth section of L
"a" End point of section A
"b" End point of section B
"c" End point of section C

What is claimed is:

1. A bypass duct of a turbofan engine comprising:
downstream guide vanes of a downstream guide vane assembly arranged in the bypass duct for de-swirling an airflow produced by a fan of the turbofan engine;
at least one fairing element arranged behind and downstream of at least one of the downstream guide vanes containing installations provided in the bypass duct,
wherein the at least one of the downstream guide vanes and the at least one fairing element is provided as a combined, one-piece vane and fairing element;
wherein the combined vane and fairing element provides for de-swirling and low-loss outflow of the airflow in a given pressure and suction-side outer contour according to a course of a skeleton line angle α of a profile determined by a respective chord length A of a respective downstream guide vane and a total length L of the combined vane and fairing element;
wherein the total length L of the combined vane and fairing element between a leading edge VK and a trailing edge HK thereof is divided into a first section A corresponding to the chord length A of the respective downstream guide vane, a second section B having a length that essentially conforms to the length of the first section A, a third section C whose length is approx. 0.7(L−2A), and a fourth section D whose length is approx 0.3(L−2A), with the skeleton line angle α increasing to a value of 80%+10% by the end of the first section A, initially further increasing and finally having a maximum value of 105%+5% in the second section B, gradually decreasing to 100% in the third section C, and remaining constant at 100% in the fourth section D.

2. The bypass duct of claim 1, wherein the length of the second section B is A±5%, the length of the third section C is 0.7(L−2A)±10% and the length of the fourth section D is 0.3(L−2A)±10%.

3. The bypass duct of claim 2, wherein the installations include at least one chosen from a line, a bracket, a support and a drive transmission mechanism.

4. The bypass duct of claim 1, wherein the installations include at least one chosen from a line, a bracket, a support and a drive transmission mechanism.

* * * * *